United States Patent
Yasukawa et al.

(10) Patent No.: US 10,412,732 B2
(45) Date of Patent: Sep. 10, 2019

(54) USER EQUIPMENT AND D2D COMMUNICATION METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/565,258

(22) PCT Filed: Apr. 7, 2016

(86) PCT No.: PCT/JP2016/061384
§ 371 (c)(1),
(2) Date: Oct. 9, 2017

(87) PCT Pub. No.: WO2016/163453
PCT Pub. Date: Oct. 13, 2016

(65) Prior Publication Data
US 2018/0110044 A1    Apr. 19, 2018

(30) Foreign Application Priority Data
Apr. 9, 2015 (JP) .................. 2015-080416

(51) Int. Cl.
*H04W 4/00* (2018.01)
*H04W 72/04* (2009.01)
*H04W 52/02* (2009.01)
*H04W 24/08* (2009.01)
*H04W 92/18* (2009.01)

(52) U.S. Cl.
CPC ....... *H04W 72/0446* (2013.01); *H04W 24/08* (2013.01); *H04W 52/02* (2013.01); *H04W 92/18* (2013.01)

(58) Field of Classification Search
CPC . H04W 72/0446; H04W 24/08; H04W 52/02; H04W 92/18; Y02D 70/20
See application file for complete search history.

(56) References Cited

U.S. PATENT DOCUMENTS

| | | | | |
|---|---|---|---|---|
| 2011/0268004 A1* | 11/2011 | Doppler | ........... | H04W 72/02 370/311 |
| 2016/0295620 A1* | 10/2016 | Lindoff | ........... | H04W 76/14 |
| 2017/0013648 A1* | 1/2017 | Jung | ........... | H04W 76/02 |

(Continued)

OTHER PUBLICATIONS

Extended European Search Report issued in corresponding European Application No. 16776619.5, dated Feb. 27, 2018 (11 pages).

(Continued)

*Primary Examiner* — Clemence S Han
(74) *Attorney, Agent, or Firm* — Osha Liang LLP

(57) ABSTRACT

User equipment to be used in a communication system supporting D2D communication includes a setting unit that receives D2D gap configuration information from a base station, and sets a D2D gap based on the D2D gap configuration information; and a communication unit that monitors a D2D signal in a different frequency using the D2D gap, wherein the D2D gap that is set based on the D2D gap configuration information is a time interval with a predetermined time length in a time domain, the time interval being allocated based on a time hopping pattern.

6 Claims, 15 Drawing Sheets

(56) References Cited

U.S. PATENT DOCUMENTS

2018/0132297 A1* 5/2018 Li .................. H04W 72/04
2018/0167988 A1* 6/2018 Jung ................ H04W 72/04

OTHER PUBLICATIONS

Ericsson; "Inter-Carrier Aspects of D2D Discovery and Communication"; 3GPP TSG RAN WG1 Meeting #78bis, R1-144320; Ljubljana, Slovenia; Oct. 6-10, 2014 (6 pages).

Kyocera; "Inter-frequency discovery considerations"; 3GPP TSG-RAN WG2 #86, R2-142240; Seoul, Republic of Korea; May 19-23, 2014 (10 pages).

ZTE; "On D2D UE capability, D2D interest and prioritization"; 3GPP TSG-RAN WG2 Meeting #87, R2-143596; Dresden, Germany; Aug. 18-22, 2014 (6 pages).

Office Action issued in corresponding Japanese Application No. 2017-511047, dated Apr. 17, 2018 (5 pages).

International Search Report issued in PCT/JP2016/061384 dated Jun. 28, 2016 (1 page).

Written Opinion of the International Searching Authority issued in PCT/JP2016/061384 dated Jun. 28, 2016 (4 pages).

Kyocera; "Additional Gaps for D2D discovery"; 3GPP TSG-RAN WG2 #88, R2-144968; San Francisco, USA; Nov. 17-21, 2014 (7 pages).

Ericsson; "Priority between cellular measurement procedure and D2D operation; impact on RRM requirements"; 3GPP TSG RAN WG4 Meeting #72bis, R4-146426; Singapore; Oct. 6-10, 2014 (3 pages).

3GPP TR 36.843 V12.0.1; "3rd Generation Partnership Project; Technical Specification Group Radio Access Network; Study on LTE Device to Device Proximity Services; Radio Aspects (Release 12)"; Mar. 2014 (50 pages).

* cited by examiner

USER EQUIPMENT AND D2D COMMUNICATION METHOD

TECHNICAL FIELD

The present invention relates to D2D communication (user equipment to user equipment communication), and particularly relates to a technique for monitoring a D2D signal in a different frequency in the D2D communication.

BACKGROUND ART

In the current mobile communication system, such as LTE, it is common that communication between user equipment UE and user equipment UE is performed through a base station eNB by performing communication between the user equipment UE and the base station eNB; and, in recent years, various techniques have been proposed for the D2D communication in which communication is directly performed between user equipment UE and user equipment UE.

In particular, for the D2D communication in LTE, the following have been proposed: "Communication (communication)" for performing data communication, such as a push-type call, between user equipment UE and user equipment UE; and "Discovery (detection)" for causing receiving user equipment to detect transmitting user equipment UE by transmitting, from the user equipment UE, a discovery signal (discovery signal) including a predetermined ID, etc., (see Non-Patent Document 1). Note that it is assumed that the Communication is applied to the Public safety (police/fire service radio), for example.

For the D2D communication to be specified in LTE, it has been proposed that each user equipment UE utilizes a part of an uplink resource that has already been specified as a resource for uplink signal transmission from the user equipment UE to a base station eNB. Additionally, it has been proposed that a base station eNB assists for allocating a resource to be used in the D2D communication.

PRIOR ART DOCUMENT

Non-Patent Document

Non-Patent Document 1: 3GPP TR 36.843 V12.0.1 (2014-03)

SUMMARY OF INVENTION

Problem to be Solved by the Invention

The D2D communication using Bluetooth (registered trademark), WiFi (registered trademark), and so forth have already existed, and, in the Discovery of the D2D communication, terminals can be detected without depending on an operator, so that, for the D2D Discovery using an LTE network, it is desirable that D2D communication is allowed between units of user equipment of respective different operators.

As described above, in the D2D communication of LIE, a part of a cellular uplink resource is to be used. Accordingly, the user equipment UE performs transmission and reception of D2D signals through a carrier of the connected cell (a frequency band, more specifically, a carrier of a predetermined frequency within the band); however, carriers to be used for respective operators are generally different, so that, in order for specific user equipment UE to receive a D2D signal from user equipment UE connected to a cell of another operator, it is required to switch to a carrier of the other operator and to monitor D2D signals in the frequency of the carrier.

Namely, for example, as illustrated in FIG. 1, when the carrier A is used for the D2D communication for the operator A and the carrier B is used for the D2D communication for the operator B, in order to receive D2D signals transmitted by user equipment UE of the operator B, user equipment UE of the operator A is required to switch from the carrier A to the carrier B to monitor the D2D signals. Similarly, in order to receive D2D signals transmitted by the user equipment UE of the operator A, the user equipment UE of the operator B is required to switch from the carrier B to the carrier A to monitor the D2D signals. Here, it is the same for the case of transmitting the D2D signals.

If the user equipment UE is connected to or served by the cell, it is required that the time period for monitoring that follows the above-described switching of the carrier be short, so that the communication with the cell is not to be blocked.

However, in the D2D communication of LTE, it is configured such that an available resource (resource pool) of a resource for cellular communication arises periodically; however, in general, a base station eNB does not know timing at which a D2D resource for the other operator arises, so that the time at which carrier switching is allowed may not match with the timing at which the D2D resource arises. Consequently, for the above-described D2D signal monitoring with the short-term carrier switching, it is considered that the D2D signal of the other operator may not be detected, or the detection may be delayed. If the monitoring period is elongated, it becomes easier to detect the D2D signals; however, the cellular communication in the connected cell and transmission and reception of D2D signals at the same frequency are to be blocked. Note that, it is referred to as "different frequency D2D signal monitoring" to perform D2D signal monitoring at a frequency that is different from the frequency used for the own connected cell or the serving cell, as in the monitoring of the D2D signals of the other operator.

The present invention is achieved in view of the above-described point, and an object is to provide a technique for allowing, in a mobile communication system, user equipment to efficiently perform the different frequency D2D signal monitoring, without blocking cellular communication and transmission/reception of D2D signals at the same frequency as much as possible.

Means for Solving the Problem

According to an embodiment of the present invention, there is provided user equipment to be used in a mobile communication system supporting D2D communication, the user equipment including a setting unit that receives D2D gap configuration information from a base station, and sets a D2D gap based on the D2D gap configuration information; and a communication unit that monitors a D2D signal in a different frequency using the D2D gap, wherein the D2D gap that is set based on the D2D gap configuration information is a time interval with a predetermined time length in a time domain, the time interval being allocated based on a time hopping pattern.

Furthermore, according to an embodiment of the present invention, there is provided a D2D communication method to be executed by user equipment that is used in a mobile communication system supporting D2D communication, the D2D communication method including a step of receiving D2D gap configuration information from a base station, and setting a D2D gap based on the D2D gap configuration information; and a step of monitoring a D2D signal in a different frequency using the D2D gap, wherein the D2D gap that is set based on the D2D gap configuration information is a time interval with a predetermined time length in a time domain, the time interval being allocated based on a time hopping pattern.

Advantage of the Invention

According to the embodiment of the present invention, a technique can be provided that allows, in a mobile communication system, user equipment to efficiently perform the different frequency D2D signal monitoring, without blocking cellular communication and transmission/reception of D2D signals at the same frequency as much as possible.

EMBODIMENTS OF THE INVENTION

Figure 1:
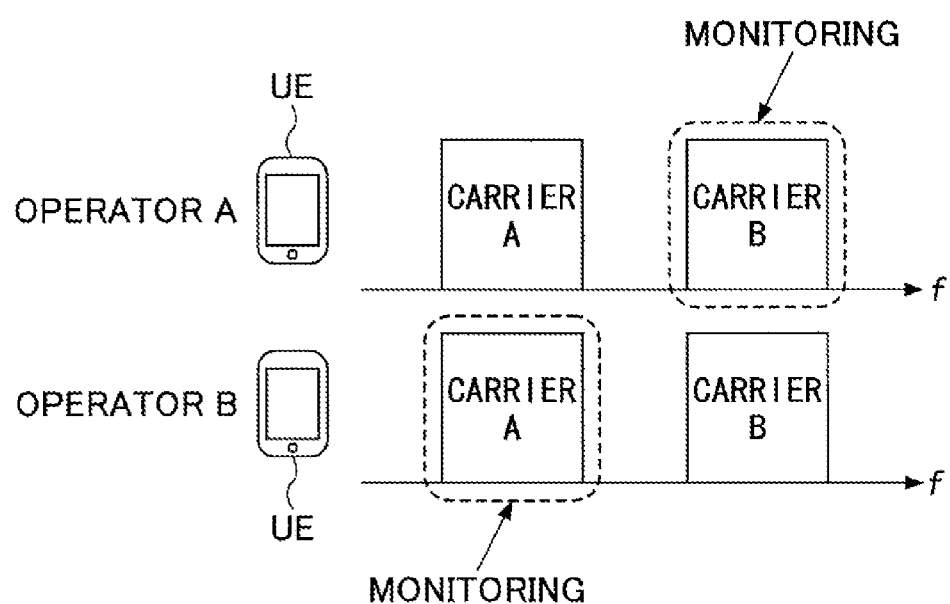
FIG. 1 is a diagram for illustrating a problem in D2D communication between operators.

In the following, an embodiment of the present invention is described by referring to the drawings. Note that the embodiment described below is merely an example; and embodiments to which the present invention is applied are not limited to the embodiment below. For example, a system based on a scheme conforming to LTE is assumed, as the mobile communication system according to the embodiment; however, the present invention is not limited to LTE, and can be applied to another scheme. Note that, in the present specification and the scope of the claims, "LTE" is used in a broad sense including, not only a communication scheme corresponding to Release 8 or 9 of 3GPP, but also a communication scheme corresponding to Release 10, 11, or on or after Release 12.

Furthermore, since the present invention can be applied to both Discovery and Communication of the D2D, in the following, signals used in Discovery and Communication are collectively referred to as D2D signals. Furthermore, the present invention is not limited to the D2D communication between operators; and can be applied to a case where different carriers are used for respective cells of the same operator, for example.

(System Configuration)

Figure 2:
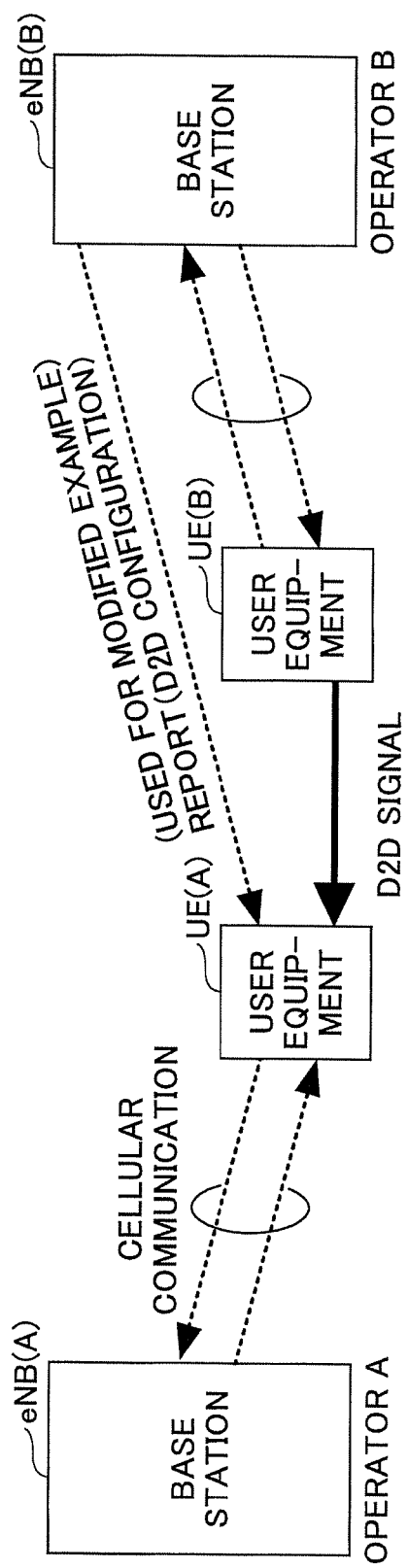
FIG. 2 is a configuration diagram of a communication system according to an embodiment of the present invention.

FIG. 2 illustrates a configuration example of a communication system according to the embodiment of the present invention. As illustrated in FIG. 2, in the communication system according to the embodiment, there exist a base station eNB(A) of an operator A and user equipment UE(A) under its control; and a base station eNB(B) of an operator B and user equipment UE(B) under its control. Carriers to be used for the D2D communication are different between the operators A and B.

Each of the units of user equipment UEs is provided with a function for executing usual cellular communication and a D2D communication function. In the embodiment, the user equipment UE(A) and the base station eNB(A) set a measurement gap (Measurement gap) for D2D; and D2D signals to be transmitted from the user equipment UE(B) are to be received (monitored) in the measurement gap. In the embodiment, the measurement gap is referred to as a D2D gap (D2D Gap).

Furthermore, in a modified example described below, configuration information of a D2D resource of the operator B is to be utilized, which is included in broadcast information reported from the base station eNB(B).

In the following, if it is described "user equipment UE" and/or "base station eNB" without indicating the operators A or B, the user equipment UE(A) and/or the base station eNB(A), in the role of the side of the operator A, are assumed, unless as indicated otherwise.

(With Regard to D2D Gap)

Next, an example of a D2D gap is described, which is to be assigned to the user equipment UE and the base station eNB in the embodiment.

Figure 3:
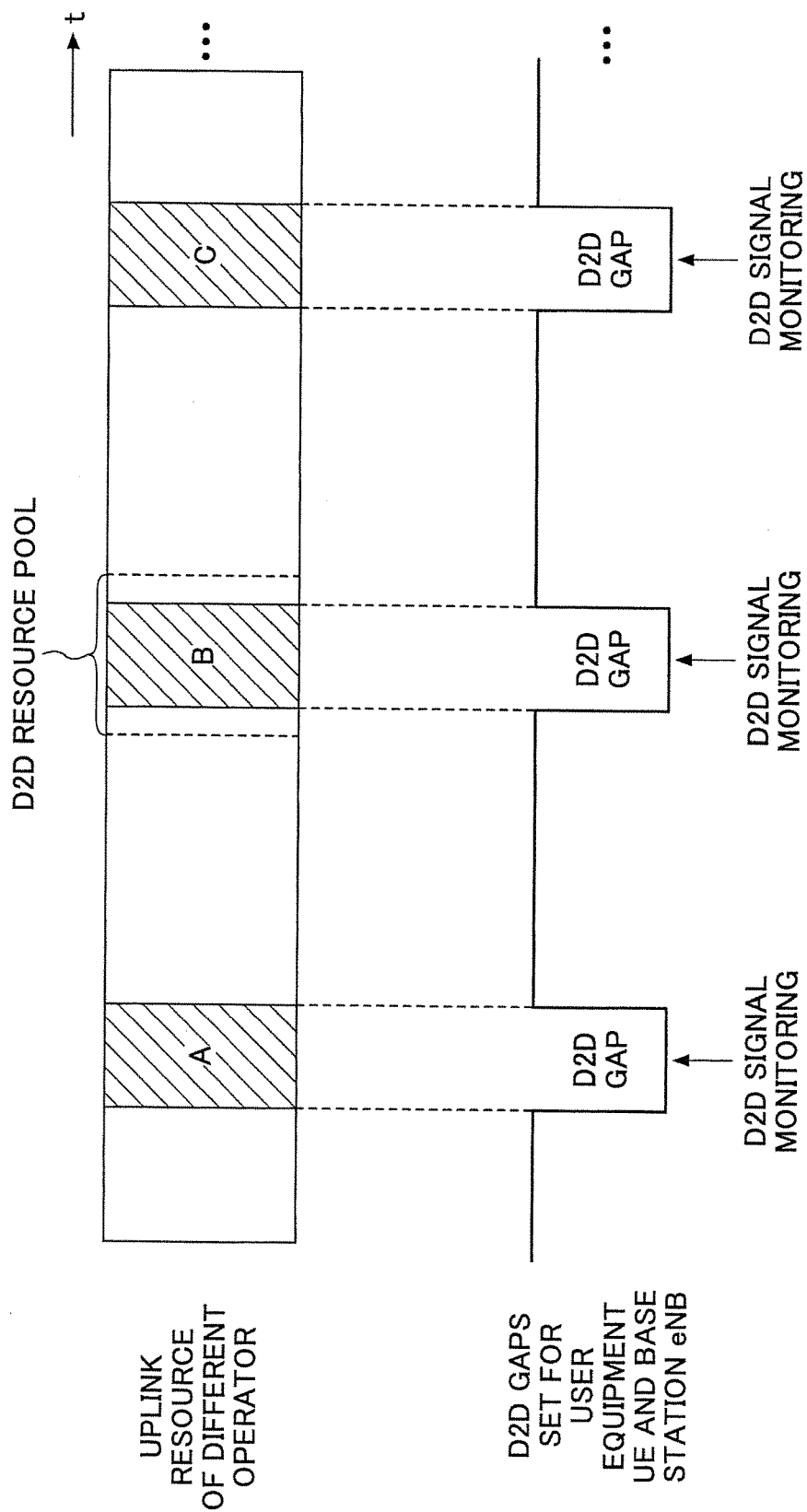
FIG. 3 is a diagram for illustrating a D2D gap.

FIG. 3 illustrates an example of the D2D gap according to the embodiment. In the example of FIG. 3, as depicted, D2D resource pools are allocated to uplink resources of the other operator. Note that the D2D resource pool occupies a part of the length of the uplink resource even in the frequency direction; however, for easiness of the description, in this example, it is depicted while focusing on the time direction.

Furthermore, as illustrated in FIG. 3, a D2D gap is provided for the user equipment UE and the base station eNB.

Transmission and reception of D2D signals in LTE are basically performed using a part of resources in the time-frequency region (D2D resource pool) allocated for D2D, which arises periodically (example: Discovery period).

In general, user equipment UE and a base station eNB in an operator are unable to know a configuration of a D2D resource pool of another operator. Thus, in the embodiment, time hopping is applied to the D2D gap so as to increase the probability that the user equipment UE and the base station eNB can receive D2D signals in a different frequency, as much as possible. A specific example of a time hopping pattern is described below.

In the example of FIG. 3, for the D2D gap provided for the user equipment UE and the base station eNB of the operator A, the gap indicated by B overlaps the D2D resource pool of another operator; and, in this gap, the user equipment UE may receive D2D signals in a different frequency transmitted from user equipment UE of the other operator, and D2D signals in another different frequency transmitted from the user equipment UE may be received by the user equipment UE of the other operator.

In the D2D gap, the user equipment UE switches a receiving carrier to a carrier (frequency) of the other operator; and monitors D2D signals transmitted from the user equipment of the other operator. For transmission, similarly, a transmitting carrier is switched to a carrier (frequency) of the other operator; and transmission is performed.

Note that, the above-described "monitoring" is, for example, to receive and to attempt to demodulate and decode a D2D signal of the other operator. The "monitoring" may be rephrased as "receiving."

(Regarding Time Hopping Pattern)

As described, in the embodiment, time hopping is applied to the D2D gap. By applying the time hopping, even if a resource pool in a frequency that is the target of transmission/reception of D2D signals is unknown, a probability of allowing D2D transmission/reception is increased by applying the D2D gap.

Figure 4:
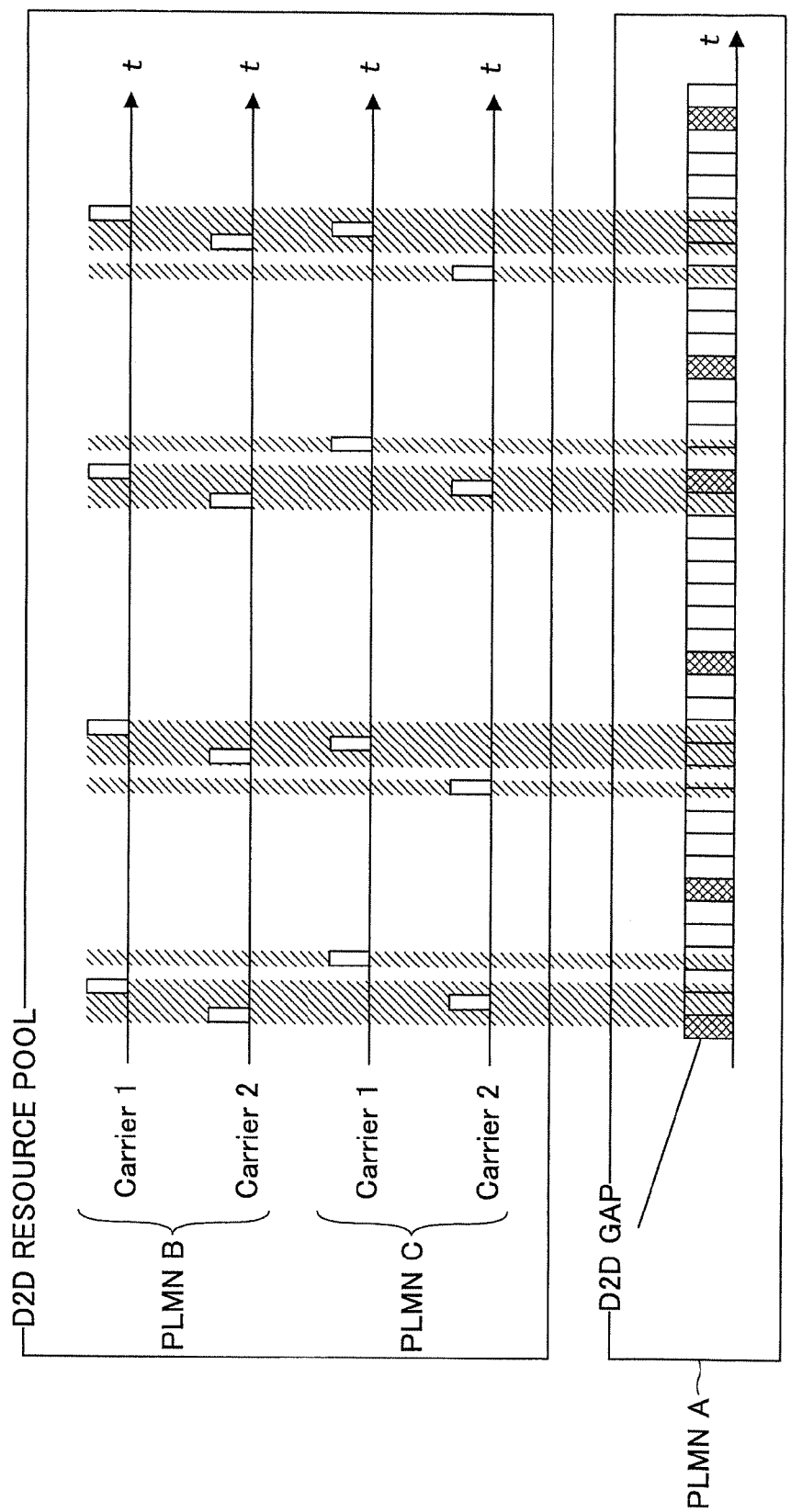
FIG. 4 is a diagram illustrating an image of a case where time hopping is applied to the D2D gaps.

FIG. 4 shows an image of a case where time hopping is applied to the D2D gaps. In the example of FIG. 4, it is shown that, for user equipment UE (and a base station eNB) in a PLMN-A (operator A), D2D gaps sequentially arise, to which time hopping is applied (the shaded subframes in the figure).

In FIG. 4, however, it is shown for PLMN-B and C (the operators B and C) that D2D resource pools are respectively formed for the carrier 1 and the carrier 2; and transmission of D2D signals is performed using the D2D resource pools.

The user equipment UE of the operator A does not know the configuration information of the D2D resource pools of the operators B and C; however, it can be seen that by using the D2D gaps to which the time hopping is applied, a D2D gap occurs that overlaps the D2D resource pools of the operator B and C. If, for a case where D2D gaps are periodically set without time hopping, it is assumed that the period is almost the same as a period of D2D resource pools of another operator, and if the D2D gap does not overlap the D2D resource pool of the other operator at the beginning, the D2D gap does not overlap the D2D resource pool of the other operator even if time elapses, so that the user equipment UE may not receive the D2D signals of the other operator. However, by applying the time hopping, such a situation is avoided, and the probability that the D2D signals in the different frequency can be received is increased. This is also the same for transmitting the D2D signals in the different frequency; and by performing transmission at the D2D gaps that arise while being time hopped, the probability that the D2D signals can be received at the receiving side is increased.

(Setting of the D2D Gaps)

Figure 5:
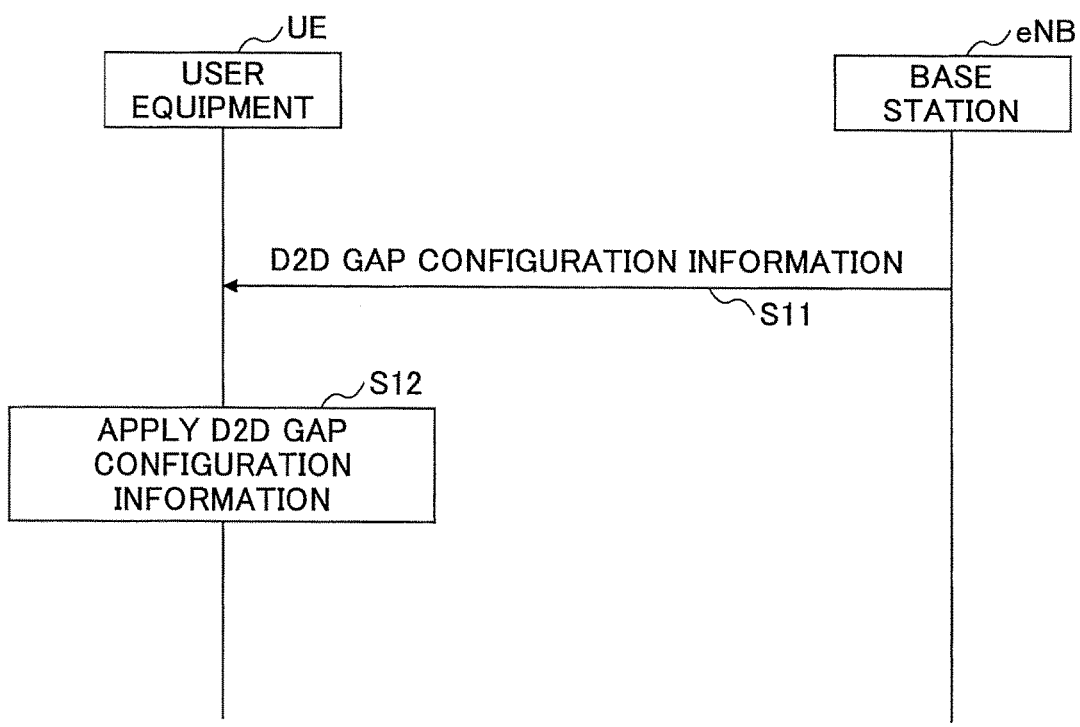
FIG. 5 is a diagram illustrating an example of signaling for, applying a time hopping pattern.

FIG. 5 shows an example of signaling for setting D2D gaps in the embodiment. As illustrated in FIG. 5, the base station eNB transmits D2D gap configuration information (D2D gap configuration) to the user equipment UE (step S11). Here, the user equipment UE may transmit a D2D communication request (a signal for reporting that transmission or reception of a D2D signal is desired) to the base station eNB; and, in response to the D2D communication request, the D2D gap configuration information may be returned to the user equipment UE.

The user equipment UE receives the D2D gap configuration information from the base station eNB, and applies the D2D gap configuration information (step S12).

Reporting of the D2D gap configuration information at step S11 can be performed by using broadcast information (SIB, etc.), for example. Reporting of the D2D gap configuration information may be performed using UE-specific RRC signaling. Note that these are merely examples; and reporting of the D2D gap configuration information may be performed by a MAC signal, a PHY signal, and so forth.

Note that, even if the same D2D configuration information is to be reported to each of UEs within a serving cell by the broadcast information, by determining, as described below, a time hopping pattern based on the UE-specific information, such as D2D gaps can be set that are different for the respective UEs.

The base station eNB maintains the D2D gap configuration information to be applied to the respective user equipment UEs; and can always find weather each user equipment UE is in the D2D gap. Consequently, the base station eNB can perform control such that, during the time interval of the D2D gap, scheduling of downlink and/or uplink is not performed.

(Example of D2D Gap Configuration)

Next, a configuration example of the D2D gaps (an example of a time hopping pattern) in the present embodiment is described.

<Time Hopping Pattern Example 1>

Figure 6:
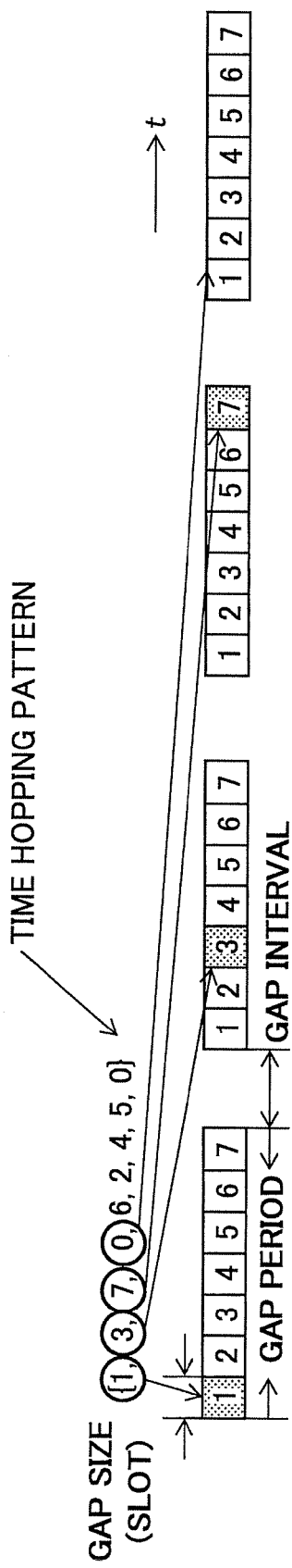
FIG. 6 is a diagram illustrating an example 1 of the time hopping pattern.

FIG. 6 shows an example 1 of the time hopping pattern, as a configuration example of the D2D gaps to which the time hopping is applied. In this example, the D2D gap configuration information transmitted from the base station eNB to the user equipment UE includes, for example, a gap period indicating a time interval (period) of the D2D gap; a gap interval indicating an interval between gap periods; and a time hopping pattern. Furthermore, an offset value indicating a time position at which a first gap period is started, and/or a gap size which is a unit time length for performing time hopping within the gap period may be included. For convenience, the time length of one gap size may be referred to as a "slot."

As a reference time for time information, such as the above-described gap period, gap interval, offset value, and gap size, the following may be used: a SFN (system Frame Number), a DFN (D2D Frame number), a subframe number within the SFN or the DFN, and so forth of the serving cell where the user equipment UE is being served. The point that the SFN, the DFN, the subframe number, and so forth can be used as reference time for setting the D2D gaps is the same for another example of the embodiment.

Furthermore, all or a part of the above-described information may be a predetermined value (a value that is known to the UE without receiving a report). If all of the above-described information is a predetermined value, the D2D gap configuration information may not be reported from the base station eNB to the user equipment UE. Alternatively, information instructing the application of the D2D gaps may be transmitted from the base station eNB to the user equipment US, as the D2D gap configuration information.

In the example shown in FIG. 6, a gap period corresponding to seven slots periodically arises while the gap periods are separated by the gap interval. As illustrated in FIG. 6, a time hopping pattern that is {1, 3, 7, 0, 6, 2, 4, 5, 0} is transmitted to the user equipment UE. The time hopping pattern indicates, for each gap period, a slot number that is set to be a D2D gap.

Namely, as illustrated in FIG. 6, for the user equipment UE that receives a report of a time hopping pattern, which is {1, 3, 7, 0, 6, 2, 4, 5, 0}, as illustrated in FIG. 6, the slot 1 of the first number (1) of the time hopping pattern is set to be the D2D gap in the first gap period; and the slot 3 of the second number (3) of the time hopping pattern is set to be the D2D gap in the subsequent period. The same applies to on and after that.

<Time Hopping Pattern Example 2>

Figure 7:
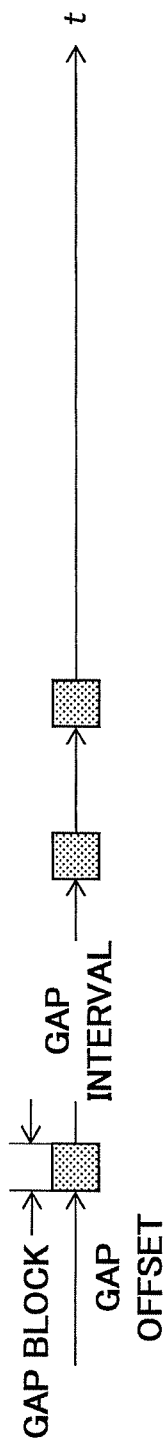
FIG. 7 is a diagram illustrating an example 2 of the time hopping pattern.

FIG. 7 illustrates an example 2 of the time hopping pattern as a configuration example of the D2D gaps to which the time hopping is applied. In this example, the D2D gap configuration information reported from the base station eNB to the user equipment UE includes, for example, information on a gap block; a gap interval indicating an interval between gap blocks; and a gap offset indicating a position of the start time of the first gap block.

As the information on the gap block, for example, a length (time length) of the gap block; information on a subframe that is set to be a D2D gap within a block (information indicating which subframe is set to a gap), and so forth. The gap block is a minimum unit of a subframe pattern of the D2D gap, and the details are described below.

In the example of FIG. 7, for example, the gap interval is determined by the time hopping pattern; and the gap blocks occur while being time hopped.

For the time hopping pattern, for example, an explicit pattern is reported from the base station eNB to the user equipment UE, similar to the example 1; and the gap intervals are changed by sequentially referring to the numbers within the pattern, similar to the example 1.

Furthermore, a determined initial value (a random number seed, etc.) may be reported from the base station eNB to the user equipment UE without reporting an explicit pattern, such as that of the example 1; and the user equipment UE may determine a time hopping pattern from the determined initial value. The determination method is not limited to a specific method; however, a numerical formula may be used that outputs a pattern, such as {1, 3, 7, 9, 6, 2, 4, 5, 0}, depending on a determined initial value, or a plurality of types of the patterns may be retained, and a pattern corresponding to the determined initial value may be used, for example. In the example 1, such a method that utilizes a determined initial value may also be adopted.

As the above-described determined initial value, a gap offset may be used. Furthermore, as the determined initial value, an ID (UE-ID) of the user equipment UE may be used.

<With Regard to Gap Block>

Each one of the D2D gaps according to the embodiment may be contiguous subframes; or may be discontinuous subframes. As an example, for each of the D2D gaps illustrated in FIG. 3, the D2D gap may be the continuously formed gap, as depicted; or a subframe that is to be the D2D gap and a subframe that is not to be the D2D gap may be included in an interval indicated to be the D2D gap.

Furthermore, in the example shown in FIG. 6, one "slot" allocated to a D2D gap by the time hopping may be continuously formed to be a gap; or a subframe to be the D2D gap and a subframe not to be the D2D gap may be included in the interval of the "slot."

As described above, by the D2D gap configuration information to be reported from the base station eNB to the user equipment UE, it can be set, for example, as to whether the one "slot" is continuously formed to be a gap or the subframes are to be mixed, which are to be the D2D gap and not to be the D2D gap; and further, a pattern (as to which positions of subframes are to be the gap, etc.), if they are to be mixed.

In the embodiment, the minimum unit of the above-described subframe pattern is referred to be the D2D gap block ("gap block," hereinafter). In the following, the gap block is described in detail.

For example, as illustrated in FIG. 7, a gap block occurs at every gap interval that is sequentially changed by the time hopping.

Figure 8:
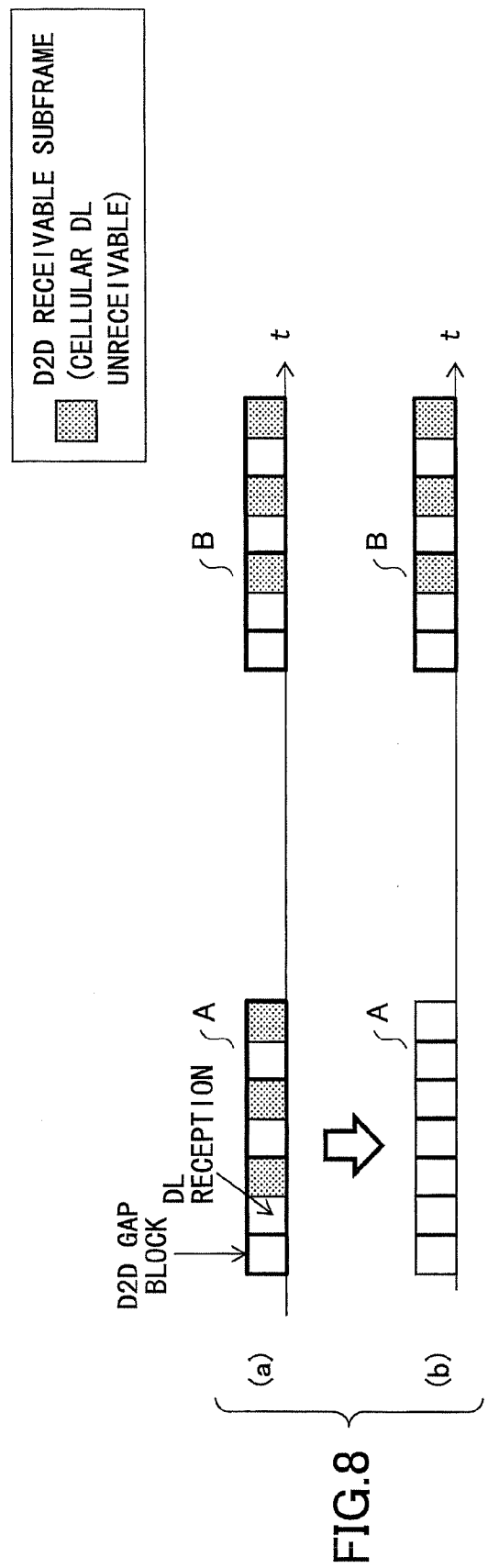
FIG. 8 is a diagram for illustrating a D2D gap block.

Configuration examples of the gap blocks are illustrated in (a) and (b) of FIG. 8. In (a) and (b) of FIG. 8, the gap block A and the gap block B are illustrated.

In the example illustrated in (a) of FIG. 8, each gap block is formed of seven subframes; and each gap block includes D2D signal receivable subframes and other subframes. The D2D signal receivable subframe is a subframe for receiving (monitoring) a target D2D signal in the different frequency; and the subframe is a gap for a cellular signal of the serving cell (non communication period). In the gap, at least DL signal reception of the serving cell is not to be performed. Namely, in the period, the base station eNB does not transmit any DL signal to the user equipment UE. Note that the cellular signal is a normal signal communicated between the base station eNB and the user equipment UE, which is not a D2D signal.

An arrangement pattern of the D2D signal receivable subframe within the gap block (the gap for the serving cell) may be determined in advance; or may be set by signaling from the base station eNB to the user equipment UE. The pattern may be common among the UEs (common within the cell) and may be set by the broadcast information; or may be specific to the UE, and may be set by a RRC signal specific to the UE.

As exemplified in the gap block A of (a) and (b) of FIG. 8, if the user equipment UE detects a (E)PDCCH addressed to itself in a subframe other than the gap of the gap block, the subsequent gap in the gap block is discarded, so that all the subsequent subframes in the gap block are used for cellular communication.

As illustrated in (a) and (b) of FIG. 8, even if a (E)PDCCH addressed to itself is detected in the gap block A, in the subsequent gap block B, gaps are set in accordance with the arrangement pattern (unless a (E)PDCCH addressed to itself is detected).

For example, the user equipment UE can receive downlink data in response to a downlink resource being allocated by the above-described (E)PDCCH reception; and can return feedback, such as an ACK/NACK, within the gap block in which the gap is released.

Furthermore, the user equipment UE can perform transmission of uplink data by receiving an uplink resource allocation (UL grant) by the above-described (E)PDCCH reception; and can receive feedback, such as an ACK/NACK, within the gap block in which the gap is released.

By performing the above-described operation, D2D signals in the different frequency can be detected while an effect of the D2D gap on the cellular communication is kept minimum.

In the example illustrated in (a) and (b) of FIG. 8, the operation for releasing the gap in the gap block is performed while using reception of a DL signal, such as a (E)PDCCH, as a trigger; however, the operation for releasing the gap may be performed while using transmission of a UL signal from the user equipment UE as a trigger.

Namely, when the user equipment UE transmits a UL signal in a subframe other than the gap within the gap block, the subsequent gap may be discarded in the gap block, and all the subsequent subframes in the gap block may be used for cellular communication. In this case, similar to the case shown in (a) and (b) of FIG. 8, in the subsequent gap block B, the gaps are formed in accordance with the arrangement pattern (unless there is a trigger for discarding).

The UL signals that can be the above-described trigger for discarding the gap are, for example, a SR (Scheduling Request); a BSR (Buffer Status Report); a RACH preamble, and so forth. It can be considered that occurrence of UL transmission of these signals implies that, in the user equipment UE, data is generated that is required to be transmitted by cellular communication.

(With Regard to UE Operation in the D2D Gap)
<Transmission and Reception of D2D Signals>

So far, it is mainly described that the user equipment UE performs reception of D2D signals in the different frequency in the D2D gap; however, the user equipment UE may perform transmission of D2D signals in the different frequency in the D2D gap.

It can be specified as operation of the user equipment UE, or it can be indicated by signaling from the base station eNB to the user equipment UE, as to whether the user equipment UE performs D2D signal transmission in the D2D gap. For example, broadcast information (when it is common for UEs) and UE specific RRC signals (for a case of UE individual setting) are used for signaling of the indication. Signals for signaling the indication are not limited to these; and, for example, it may be performed by a MAC signal or a PHY signal.

<UL Transmission of a Cellular Signal in the D2D Gap>

In the embodiment, D2D signals in the different frequency are monitored (i.e., received) in the D2D gap, so that reception of DL signals of the serving cell is disallowed in the D2D gap. Transmission of UL signals of the serving cell in the D2D gap may be disallowed similar to the reception of the DL signals, or the transmission of the UL signals may be allowed.

If transmission of UL signals of the serving cell in the D2D gap is allowed, three events, which are D2D signal transmission, D2D signal reception, and cellular UL signal transmission, may simultaneously occur in the gap period. However, only one of them can be executed at the same time. Thus, in the embodiment, the cellular UL signal transmission may be prioritized among these. For example, if a trigger for the cellular UL signal transmission (occurrence of timing of SRS/CQI/ACK•NACK, occurrence of UL data, etc.) occurs, the cellular UL signal transmission may be executed, without executing D2D signal transmission nor D2D signal reception. By such operation, degradation of cellular performance can be suppressed as much as possible.

Contrary to the description above, in the D2D gap, neither reception of DL signals of the serving cell nor UL transmission may be performed. In this manner, D2D performance is enhanced in exchange for degradation of cellular performance.

Furthermore, depending on types of cellular UL signals, it can be determined as to whether UL transmission in the D2D gap is performed/not performed; for example, it can be determined not to perform periodic SRS transmission in the same carrier. The reason is that, even if it is determined not to perform periodic SRS transmission, no significant effect is caused on the performance of the cellular communication.

For example, it can be considered that CQI, ACK/NACK, and so forth cause a significant effect on the performance of the cellular communication of the user equipment UE, so that they can be preferentially transmitted in the D2D gap over D2D signal transmission/reception.

As described above, there are two patterns for the D2D gap, which are "the cellular UL signal transmission is allowed while only the cellular DL signal reception is not performed," and "neither the cellular DL signal reception nor cellular UL signal transmission is performed." Furthermore, if the cellular UL signal transmission is allowed, there are patterns, such as "the cellular UL signal transmission is prioritized over the D2D signal transmission/reception," or "only a specific UL signal is prioritized over the D2D signal transmission/reception."

It can be specified as operation of the user equipment UE, or it can be indicated by signaling from the base station eNB to the user equipment UE, as to which operation is to be performed by the user equipment UE with what priority. For example, broadcast information (when it is common for UEs) and UE specific RRC signals (for a case of UE individual setting) are used for signaling of the indication. Signals for signaling the indication are not limited to these; and, for example, it may be performed by a MAC signal or a PHY signal.

Modified Example

Next, a modified example is described. In the example described so for, it is assumed that the user equipment UE and the base station eNB do not know the configuration information (configuration) of the D2D resource pool of the other operator.

The configuration information of the D2D resource pool is transmitted from the base station eNB as the broadcast information. Accordingly, for example, as illustrated in FIG. 2, by receiving the broadcast information from the base station eNB (B), the user equipment UE(A) can find the D2D resource configuration information of the operator B, and D2D gaps can be set based on the resource configuration information. By setting the D2D gaps based on the resource configuration information, D2D can be efficiently monitored. However, when the D2D gaps at the side of the operator A are set in accordance with the D2D resource configuration information of the operator B, it can be considered that a situation periodically occurs in which UEs simultaneously monitor D2D signals in a specific subframe, so that it may not be preferable from the perspective of maintaining the performance of the cellular communication.

Thus, an example is described, as a modified example, where D2D gaps are set by combining D2D resource configuration information of another operator and time hopping. In the following, as an example, a case is described where a D2D gap block is set based on D2D resource information obtained by the broadcast information, and the subframe that is to be a gap within the gap block is allocated by time hopping.

<Basic Operation Example in the Modified Example>

Figure 9:
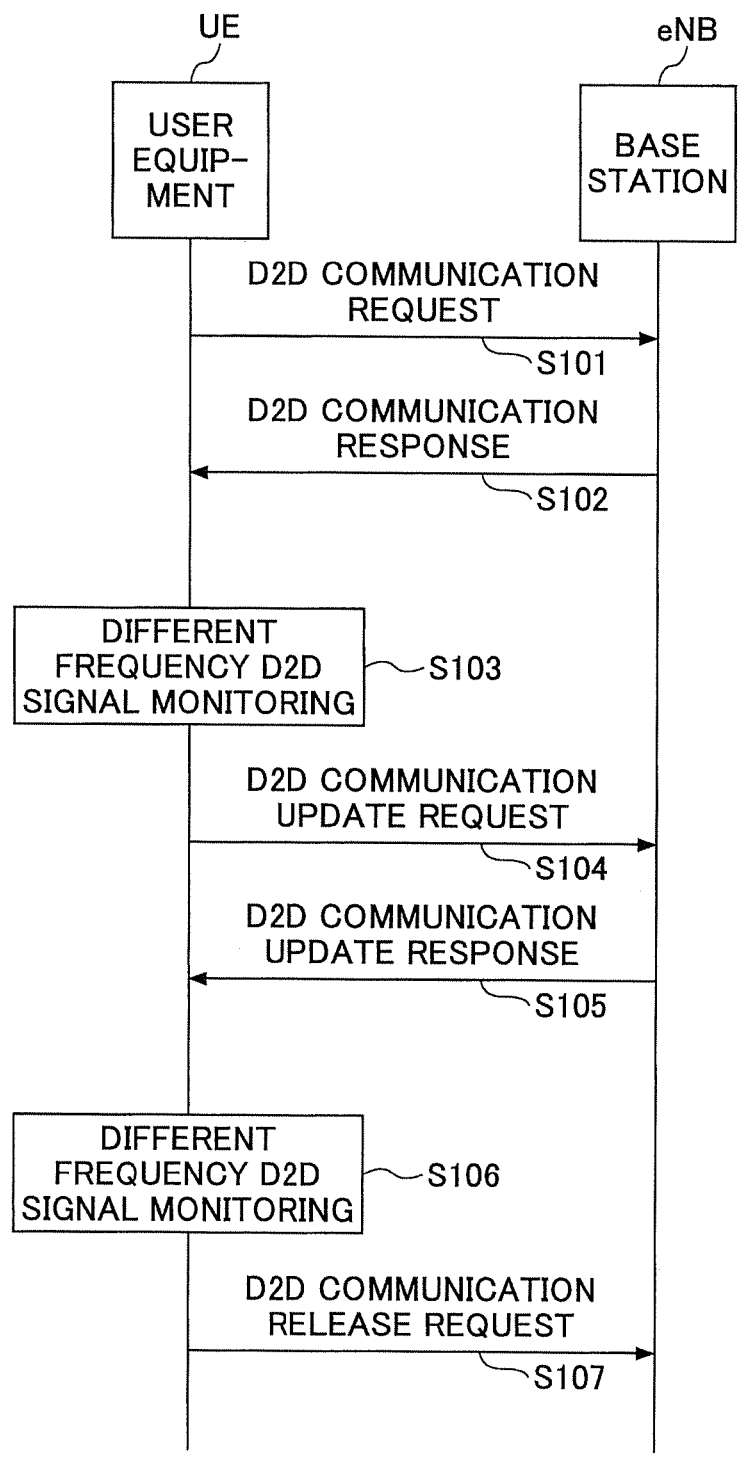
FIG. 9 is a diagram for illustrating a modified example.

A basic operation example of the user equipment UE and the base station eNB in the modified example is described by referring to FIG. 9. In FIG. 9, the user equipment UE is connected to or is served by a cell of the base station eNB.

As the assumption of FIG. 9, for example, the user equipment UE finds a resource configuration of D2D communication of another operator by receiving broadcast information of the other operator from a base station eNB of the other operator.

At step S101, the user equipment UE transmits a D2D communication request to the base station eNB. The D2D communication request is, for example, a signal to request for transmission or reception of a Discovery signal. The D2D communication request signal may include, for example, the D2D resource configuration information of the other operator, which is obtained by the user equipment UE through the broadcast information. Furthermore, a frequency that is desired by the user equipment UE for reception or transmission may be included in the D2D communication request.

The base station eNB determines (sets) the D2D gap configuration information including a gap block and a time hopping pattern in the block for the user equipment based on the D2D communication request; and returns a D2D communication response including the D2D gap configuration information to the user equipment UE (step S102).

The user equipment UE that receives the D2D communication response applies the D2D gap configuration information included in the D2D communication response received at step S102; and performs monitoring of D2D signals in the different frequency in the D2D gap. Here, the example of monitoring is described; however, the operation described above can be applied to the operation of the user equipment UE in the gap block and the D2D gap.

Here, for example, if the D2D resource configuration information of the other operator is updated, the user equipment UE finds the update based on the broadcast information received from the base station eNB of the other operator; transmits, to the base station eNB, a D2D communication update request that is to request for setting of the updated D2D gaps (step S104); and receives a D2D communication update response (the updated D2D gap configuration information) from the base station eNB (step S105). Consequently, the updated gaps can be set for the user equipment UE and the base station eNB; and the user equipment UE can perform monitoring of D2D signals of the other operator using the updated D2D gaps (step S106).

After that, for example, if it becomes unnecessary to perform monitoring of the D2D signals of the other operator, the user equipment UE transmits a D2D communication release request to the base station eNB (step S107). The base station eNB that receives the D2D communication release request cancels the setting of the configured D2D gaps, and releases the D2D gaps. Consequently, the period that was the D2D gaps can be used for the cellular communication.

For the D2D communication request, the D2D communication update request, and the D2D communication release request, which are described by referring to FIG. 9, a signal for higher layer signaling, such as that of the RRC or the MAC, may be used; or the PUCCH may be used. Furthermore, for the response and the setting from the base station eNB to the user equipment UE, a signal for higher layer signaling, such as that of the RRC or the MAC, may be used; or the (E)PDCCH may be used.

<Example of the D2D Gap According to the Modified Example>

Figure 10:
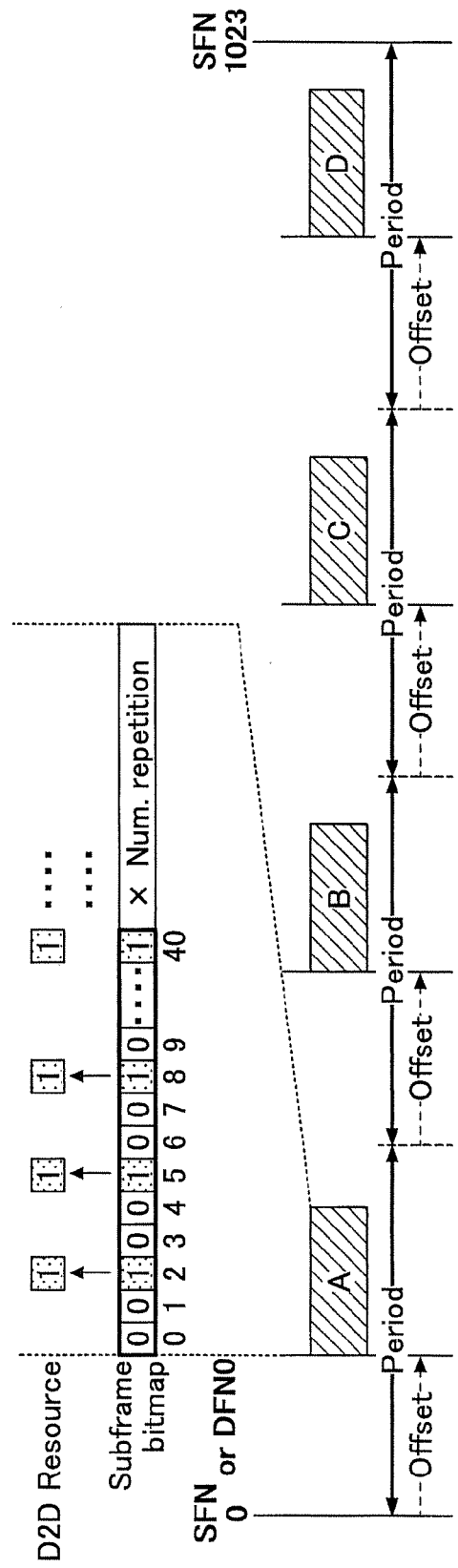
FIG. 10 is a diagram for illustrating a configuration example of D2D resources.

FIG. 10 is a diagram illustrating a configuration example of the D2D resources. This is a diagram focusing on the configuration in the time direction. In the example shown in FIG. 10, the D2D resources are represented as a subframe bitmap. Furthermore, the bitmap is repeated the number of times of num.repetition. Furthermore, an offset is specified that indicates the start position of each period (period).

In the modified example, the user equipment UE retrieves, as the D2D resource configuration information of the other operator, the bitmap, the period (period), the offset, the number of times of repetition, and so forth, which are shown in FIG. 10, from the broadcast information; and reports these to the base station eNB. Note that it is an example to report the D2D resource configuration information of the other operator from the user equipment UE to the base station eNB; and the base station eNB may obtain the D2D resource configuration information of the other operator by, for example, communication between the base stations, and creates the D2D gap configuration information from the D2D resource configuration information to transmit it to the user equipment UE.

Figure 11:
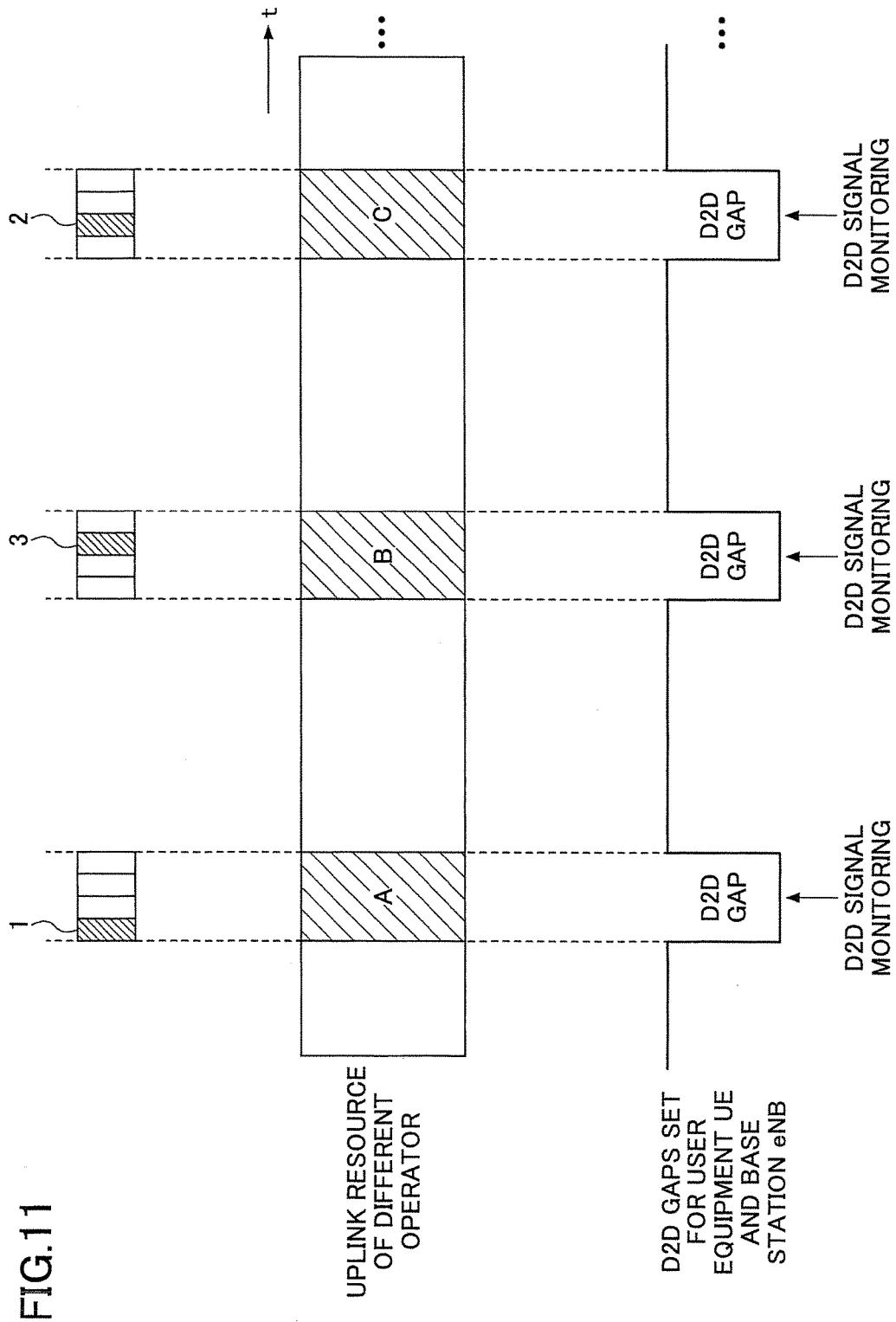
FIG. 11 is a diagram illustrating an example of the time hopping in the modified example.

As an example, in the modified example, the base station eNB determines the gap blocks and the time hopping pattern, as illustrated in FIG. 11; and transmits, as the D2D gap configuration information, the determined details to the user equipment UE.

In FIG. 11, the blocks indicated by A, B, and C, respectively, are the gap blocks; and they correspond to the blocks indicated by A, B, and C in FIG. 10. Namely, in the modified example, blocks in which transmission and reception of D2D signals may be performed are set as the gap blocks. The configuration information of the gap blocks to be reported to the user equipment UE includes a time length of the gap block, the period, the offset, and so forth.

Within each gap block, a D2D gap is set by the time hopping pattern without considering an actual bitmap.

Namely, if the actual bitmap is considered, distribution among units of user equipment UEs may not be achieved, so that, in the modified example, the D2D gaps are set by the time hopping pattern without considering the actual bitmap.

The example of FIG. 11 shows a schematic example; and for the target user equipment UE, a D2D gap is set in the first subframe in the gap block A; a D2D gap is set in the third subframe in the gap block B; and a D2D gap is set in the second subframe in the gap block C. Note that the setting of the time hopping pattern can be made similar to the examples illustrated in FIG. 6 and FIG. 7, for example.

(Device Configuration Example)

Configuration examples of the user equipment UE and the base station eNB are described below, which perform the operation according to the embodiment of the present invention (at least, all the operations described above).

<Configuration Example of the User Equipment UE>

Figure 12:
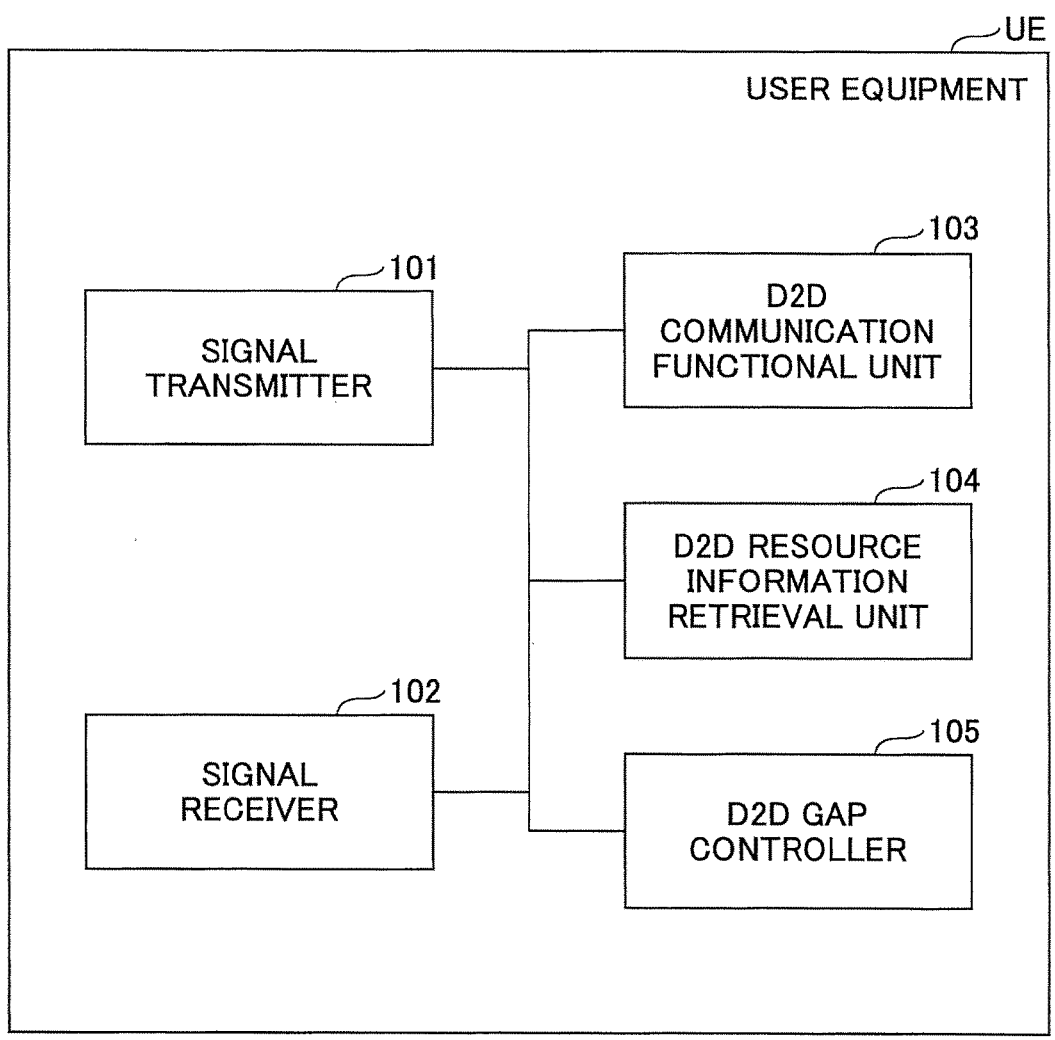
FIG. 12 is a configuration diagram of user equipment UE.

FIG. 12 shows a functional configuration diagram of the user equipment UE according to the embodiment. As illustrated in FIG. 12, the user equipment UE includes a signal transmitter 101; a signal receiver 102; a D2D communication functional unit 103; a D2D resource information retrieval unit 104; and a D2D gap controller 105. Note that FIG. 12 only shows, in the user equipment UE, functional units that are particularly related to the embodiment of the present invention; and at least functions, which are not depicted, for executing operation conforming to LTE are also included. The functional configuration illustrated in FIG. 12 is merely an example. The functional division and names of functional units may be any division and names, provided that the operation according to the embodiment can be executed.

The signal transmitter 101 includes a function for generating various types of physical layer signals from one or more higher layer signals to be transmitted from the user equipment UE, and for wirelessly transmitting them. The signal transmitter 101 includes a transmission function for the D2D communication; and a transmission function for the cellular communication.

The signal receiver 102 includes a function for wirelessly receiving various types of signals from any other user equipment UE or the base station eNB, and for retrieving a higher layer signal from a received physical layer signal. The signal receiver 102 includes a reception function for the D2D communication; and a reception function for the cellular communication.

The D2D communication functional unit 103 includes D2D application functions; and executes Discovery signal reception control, D2D data transmission/reception control, and so forth.

The D2D resource information retrieval unit 104 retrieves D2D resource information from broadcast information received from a base station of another operator; and stores it in a memory, for example. Note that, in the embodiment, the D2D resource information retrieval unit 104 is a functional unit related to the modified example.

As described above, the D2D gap controller 105 includes a function for receiving D2D gap configuration information from the base station, and sets D2D gaps for transmitting and receiving D2D signals in the different frequency based on the D2D gap configuration information. To set a D2D gap means, for example, to store the D2D gap configuration information in a memory, etc., and to calculate an interval (subframe) of the D2D gap in accordance with the D2D gap configuration information; and to report the gap period (e.g., information indicating which subframe corresponds to the gap) to the signal transmitter 101 and/or the signal receiver 102. The signal transmitter 101 and/or the signal receiver 102 may perform, for example, operation such that, in the interval of the D2D gap, transmission and reception of D2D signals in the different frequency are performed while not performing transmission nor reception of cellular signals.

Furthermore, when transmission or reception of a cellular signal is to be performed by the signal transmitter 101 and/or the signal receiver 102 in a subframe other the D2D gap in the gap block, the D2D gap controller 105 may perform operation for releasing the D2D gap within the gap block.

Furthermore, the D2D gap controller 105 may indicate the signal transmitter 101 to preferentially execute, in the D2D gap, transmission of an uplink cellular signal over transmission/reception of a D2D signal. Furthermore, the D2D gap controller 105 may execute control such that transmission of a specific cellular signal of uplink cellular signals is not to be executed in the D2D gap.

Furthermore, the D2D gap controller 105 may execute the operation described in the modified example, namely, to transmit, to the base station of the serving cell, the D2D communication request including the D2D resource configuration information received from the other base station; to receive the D2D gap configuration information from the base station as the response to the D2D communication request; and to set the D2D gaps, while considering the D2D resource configuration information in the other base station, based on the D2D gap configuration information.

The entire configuration of the user equipment UE shown in FIG. 12 may be implemented by a hardware circuit (e.g., one or more IC chips); or a part of it may be formed of a hardware circuit, and the other part may be implemented by a CPU and a program.

Figure 13:
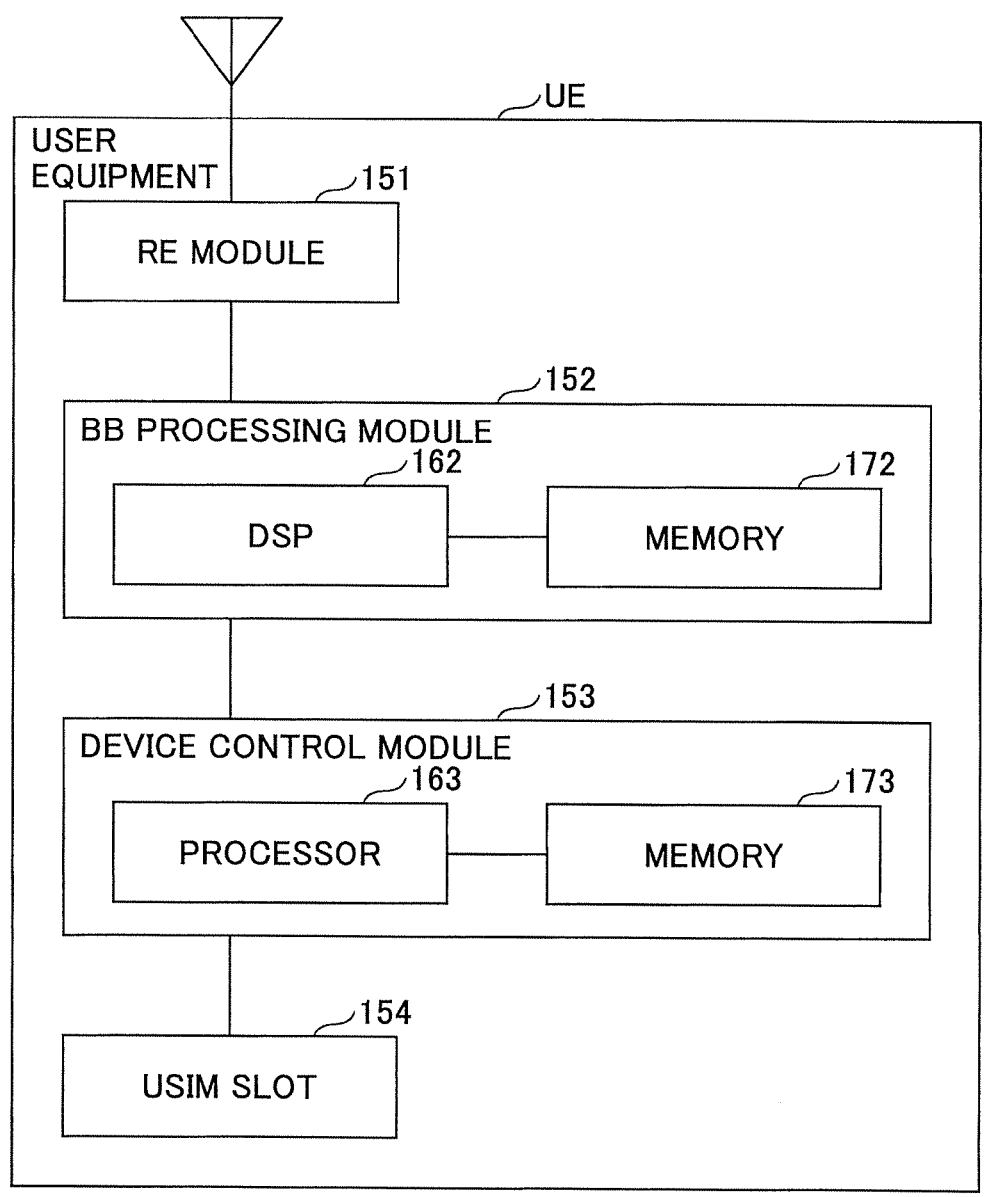
FIG. 13 is a HW configuration diagram of the user equipment UE.

FIG. 13 is a diagram showing an example of a hardware (HW) configuration of the user equipment UE. FIG. 13 shows a configuration closer to an implementation example, compared to FIG. 12. As illustrated in FIG. 13, the UE includes a RE (Radio Equipment) module 151 for executing a process related to a radio signal; a BB (Base Band) processing module 152 for executing baseband signal processing; a device control module 153 for executing a process of a higher layer, etc.; and a USIM slot 154 that is an interface for accessing a USIM card.

The RE module 151 generates a radio signal to be transmitted from an antenna by applying a D/A (Digital-to-Analog) conversion, modulation, a frequency conversion, power amplification, and so forth to a digital baseband signal received from the BB processing module 152. Furthermore, a digital baseband signal is generated by applying a frequency conversion, an A/D (Analog to Digital) conversion, demodulation, and so forth to a received radio signal; and it is passed to the BB processing module 152. The RE module 151 includes, for example, a function of a physical layer, etc., in the signal transmitter 101 and the signal receiver 102 of FIG. 12.

The BB processing module 152 executes a process of mutually converting an IP packet and a digital baseband signal. A DSP (Digital Signal Processor) 162 is a processor for executing signal processing in the BB processing module 152. A memory 172 is used as a work area of the DSP 162. The BB processing module 152 includes, for example, a function of a layer 2, etc., in the signal transmitter 101 and the signal receiver 102 of FIG. 12; the D2D communication functional unit 103; the D2D resource information retrieval unit 104; and the D2D gap controller 105. Note that all of or a part of the functions of the D2D communication functional unit 103, the D2D resource information retrieval unit 104, and the D2D gap controller 105 may be included in the device control module 153.

The device control module 153 executes protocol processing of the IP layer, processing of various types of applications, and so forth. A processor 163 is a processor for executing a process to be executed by the device control module 153. A memory 173 is used as a work area of the processor 163. Furthermore, the processor 163 reads out data from and writes data in the USIM through the USIM slot 154.

<Configuration Example of the Base Station eNB>

Figure 14:
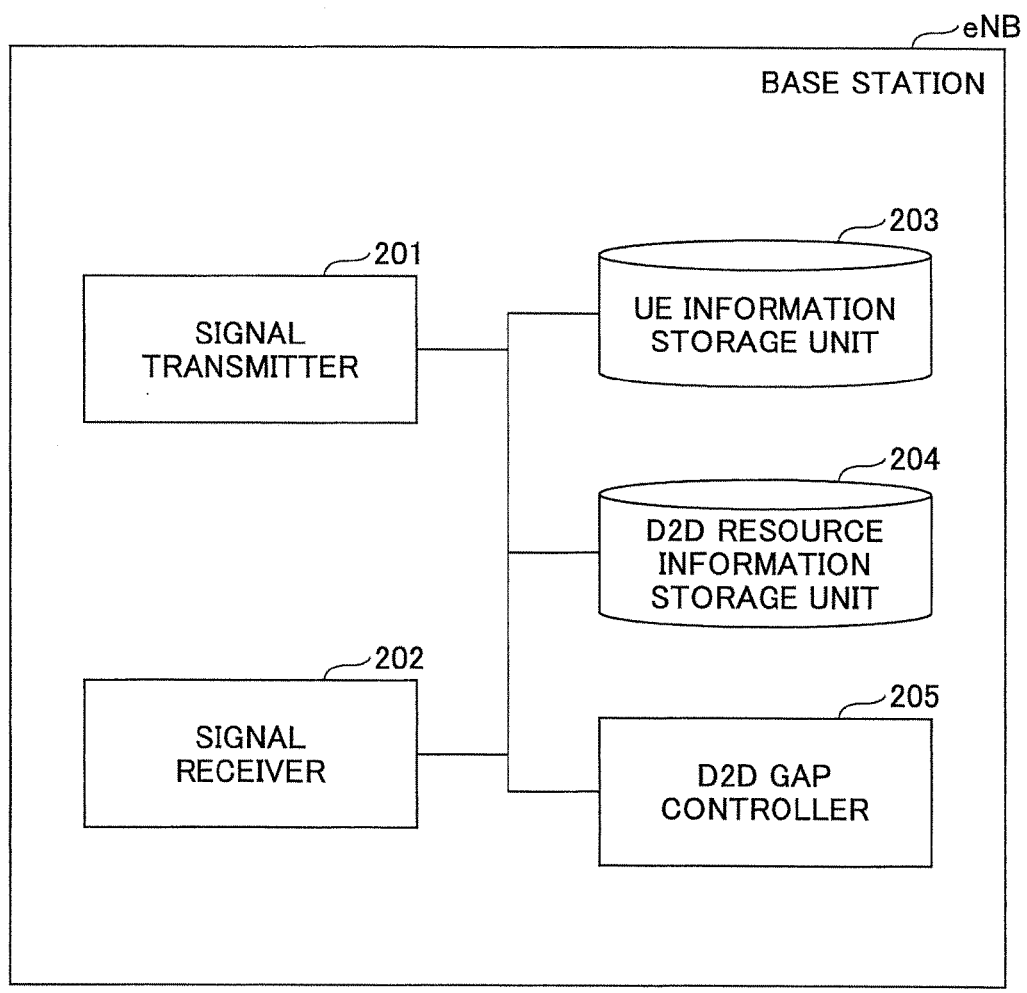
FIG. 14 is a configuration diagram of a base station eNB.

FIG. 14 shows a functional configuration diagram of the base station eNB according to the embodiment. As illustrated in FIG. 14, the base station eNB includes a signal transmitter 201; a signal receiver 202; a UE information storage unit 203; a D2D resource information storage unit 204; and a D2D gap controller 205. Note that FIG. 14 only shows, in the base station eNB, functional units that are particularly related to the embodiment of the present invention; and at least functions, which are not depicted, for executing operation as a base station in a mobile communication system conforming to LTE are also included. The functional configuration illustrated in FIG. 14 is merely an example. The functional division and names of functional units may be any division and names, provided that the operation according to the embodiment can be executed.

The signal transmitter 201 includes a function for generating various types of physical layer signals from one or more higher layer signals to be transmitted from the base station eNB, and for wirelessly transmitting them. The signal receiver 202 includes a function for wirelessly receiving various types of signals from user equipment UE, and for retrieving a higher layer signal from a received physical layer signal.

The UE information storage unit 203 stores information, which is received from each user equipment as UE capability; and, for example, the D2D gap controller 205 can determine whether a D2D gap can be set for the user equipment UE by referring to this information.

The D2D resource information storage unit 204 stores, for example, D2D resource information of another base station (another operator) received from the user equipment UE; and the D2D gap controller 205 can create, while considering the D2D resource information of the other operator, D2D gap configuration information by referring to this information. Note that the D2D resource information storage unit 204 is a functional unit related to the modified example.

As described above, the D2D gap controller 205 creates the D2D gap configuration information and reports it to the user equipment UE, so that time hopped D2D gaps can be set to the user equipment UE.

The entire configuration of the base station eNB shown in FIG. 14 may be implemented by a hardware circuit (e.g., one or more IC chips); or a part of it may be formed of a hardware circuit, and the other part may be implemented by a CPU and a program.

Figure 15:
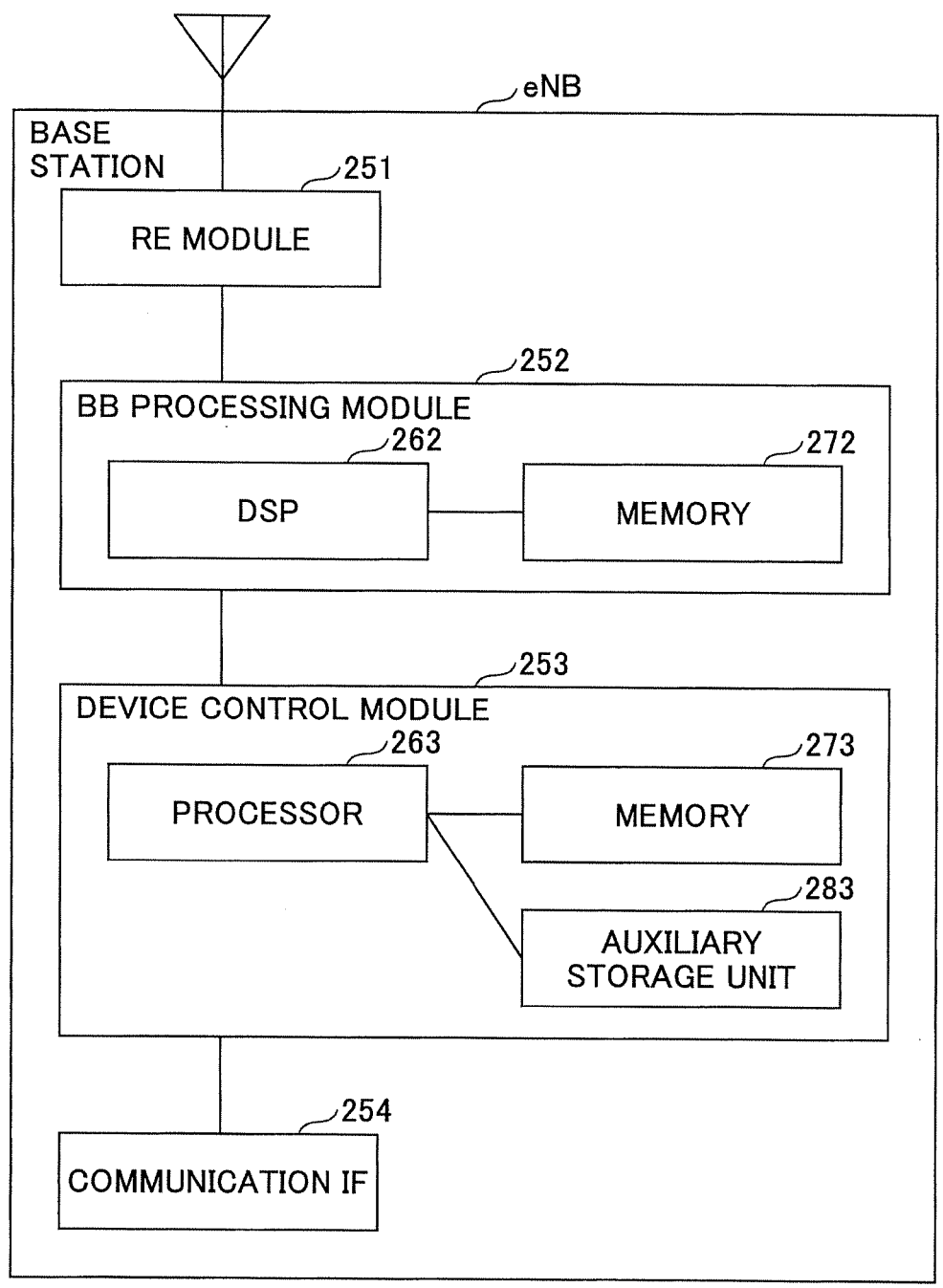
FIG. 15 is a HW configuration diagram of the base station eNB.

FIG. 15 is a diagram showing an example of a hardware (HW) configuration of the base station eNB. FIG. 15 shows a configuration closer to an implementation example, compared to FIG. 14. As illustrated in FIG. 15, the base station eNB includes a RE module 251 for executing a process related to a radio signal; a BB processing module 252 for executing baseband signal processing; a device control module 253 for executing a process of a higher layer, etc.; and a communication IF 254 that is an interface for connecting to a network.

The RE module 251 generates a radio signal to be transmitted from an antenna by applying a D/A conversion, modulation, a frequency conversion, power amplification, and so forth to a digital baseband signal received from the BB processing module 252. Furthermore, a digital baseband signal is generated by applying a frequency conversion, an A/D conversion, demodulation, and so forth to a received radio signal; and it is passed to the BB processing module 252. The RE module 251 includes, for example, a function of a physical layer, etc., in the signal transmitter 201 and the signal receiver 202 of FIG. 14.

The BB processing module 252 executes a process of mutually converting an IP packet and a digital baseband signal. A DSP 262 is a processor for executing signal processing in the BB processing module 252. A memory 272 is used as a work area of the DSP 262. The BB processing module 252 includes, for example, a function of a layer 2, etc., in the signal transmitter 201 and the signal receiver 202 of FIG. 14; the UE information storage unit 203; the D2D resource information storage unit 204; and the D2D gap controller 205. Note that all of or a part of the functions of the UE information storage unit 203, the D2D resource information storage unit 204, and the D2D gap controller 205 may be included in the device control module 253.

The device control module 253 executes IP layer protocol processing, OAM processing, and so forth. The processor 263 is a processor that executes a process to be executed by the device control module 253. The memory 273 is used as a work area of the processor 263. An auxiliary storage unit 283 is, for example, a HDD, etc.; and stores various types of setting information, etc., for the base station eNB itself to operate.

Conclusion of the Embodiment

As described above, according to the embodiment, there is provided user equipment to be used in a communication system supporting D2D communication, the user equipment including a setting unit that receives D2D gap configuration information from a base station, and sets a D2D gap based on the D2D gap configuration information; and a communication unit that monitors a D2D signal in a different frequency by using the D2D gap, wherein the D2D gap that is set based on the D2D gap configuration information is a time interval with a predetermined time length in a time domain, the time interval being allocated based on a time hopping pattern.

By the above-described configuration, a technique can be provided that allows, in a mobile communication system, user equipment to efficiently perform the different frequency D2D signal monitoring, without blocking cellular communication and transmission/reception of D2D signals at the same frequency as much as possible.

The D2D gap is, for example, the time interval with the predetermined time length, the time length being allocated based on the time hopping pattern in each gap period allocated per predetermined time interval. With this configuration, time hopping can be performed base on the time hopping pattern in units of the gap period allocated per predetermined time interval, so that processing of the time hopping can be easily implemented.

For example, the D2D gap may be a predetermined subframe within a gap block with another predetermined time length; and the gap block may be allocated per time interval determined based on the time hopping pattern. With this configuration time hopping can be performed in units of gap blocks, so that, even if time hopping is to be performed, control within the gap block can be common among the gap blocks.

In response to detecting that transmission or reception of a cellular signal in a cell of the base station occurs in a subframe other than the D2D gap in the gap block, the communication unit may release the D2D gap within the gap block. With this configuration cellular communication can be efficiently performed while executing monitoring of D2D signals in a different frequency.

The communication unit may preferentially execute, in the D2D gap, transmission of an uplink cellular signal in the cell of the base station over transmission and reception of a D2D signal. With this configuration, monitoring of D2D signals in the different frequency can be performed without degrading the performance of the cellular communication.

The communication unit may suspend, in the D2D gap, transmission of a specific cellular signal of uplink cellular signals in the cell of the base station. For example, by selecting, as the specific cellular signal, a signal that almost does not affect the performance of the cellular communication, monitoring of D2D signals in the different frequency can be efficiently performed without degrading the performance of the cellular communication.

The setting unit may transmit, to the base station, a D2D communication request including D2D resource configuration information received from another base station that is different from the base station, and may receive, from the base station, the D2D gap configuration information as a response to the D2D communication request. With this configuration, the D2D gap configuration information considering the D2D resource configuration information of the different operator, etc., can be obtained, so that monitoring of D2D signals in the different frequency can be efficiently executed.

Note that the "unit" in the configuration of each of the above-described devices may be replaced with "part," "circuit," "device," and so forth.

The user equipment UE described in the embodiment may have a configuration that is implemented by executing a program by a CPU (processor) in the user equipment including the CPU and a memory; may have a configuration that is implemented by hardware provided with a logic for the process described in the embodiment, such as a hardware circuit; or may have a mixture of programs and hardware.

The base station eNB described in the embodiment may have a configuration that is implemented by executing a program by a CPU (processor) in the base station eNB including the CPU and a memory; may have a configuration that is implemented by hardware provided with a logic for the process described in the embodiment, such as a hardware circuit; or may have a mixture of programs and hardware.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of description, the base station and the user equipment are described by using the functional block diagrams; however, such devices may be implemented in hardware, software, or combinations thereof. The software to be executed by the processor included in the user equipment and the base station in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention is not limited to the above-described embodiment; and various variations, modifications, alternatives, replacements, and so forth are included in the present invention without departing from the spirit of the present invention.

This patent application is based upon and claims the benefit of priority of Japanese Patent Application No. 2015-080416 filed on Apr. 9, 2015, and the entire contents of Japanese Patent Application No. 2015-080416 are incorporated herein by reference.

LIST OF REFERENCE SYMBOLS eNB: base station
UE: user equipment
101: signal transmitter
102: signal receiver
103: D2D communication functional unit
104: D2D resource information retrieval unit
105: D2D gap controller
151: RE module
152: BB processing module
153: device control module
154: USIM slot
201: signal transmitter
202: signal receiver
203: UE information storage unit
204: D2D resource information storage unit
205: D2D gap controller
251: RE module
252: BB processing module
253: device control module
254: communication IF

The invention claimed is:

1. User equipment to be used in a mobile communication system supporting device to device communication, the user equipment comprising:
a setting unit that receives device-to-device communication gap configuration information from a base station, and sets a device-to-device communication gap based on the device-to-device communication gap configuration information; and
a communication unit that monitors a device-to-device communication signal in a different frequency using the device-to-device communication gap,
wherein the device-to-device communication gap that is set based on the device-to-device communication gap configuration information is a time interval with a predetermined time length in a time domain, the time interval being allocated based on a time hopping pattern.

2. The user equipment according to claim 1, wherein the communication unit preferentially executes, in the device-to-device communication gap, transmission of an uplink cellular signal in a cell of the base station over transmission and reception of a device-to-device communication signal.

3. The user equipment according to claim 2, wherein the communication unit suspends, in the device-to-device communication gap, transmission of a specific cellular signal of uplink cellular signals in the cell of the base station.

4. A device-to-device communication method to be executed by user equipment that is used in a mobile communication system supporting device-to-device communication, the device-to-device communication method comprising:
a step of receiving device-to-device communication gap configuration information from a base station, and setting a device-to-device communication gap based on the device-to-device communication gap configuration information; and
a step of monitoring a device-to-device communication signal in a different frequency using the device-to-device communication gap,
wherein the device-to-device communication gap that is set based on the device-to-device communication gap configuration information is a time interval with a predetermined time length in a time domain, the time interval being allocated based on a time hopping pattern.

5. A user equipment to be used in a mobile communication system supporting device-to-device communication, the user equipment comprising:
a signal transmission unit that transmits a request of device-to-device communication gap configuration information to a base station;
a setting unit that receives device-to-device communication gap configuration information from the base station, and sets a device-to-device communication gap based on the device-to-device communication gap configuration information; and
a device-to-device communication gap control unit that determines whether to transmit an uplink signal in the device-to-device communication gap depending on a type of the uplink signal.

6. The user equipment according to claim 5, wherein the device-to-device communication gap that is set based on the device-to-device communication gap configuration information is a time interval with a predetermined time length in a time domain, the time interval being allocated based on a time hopping pattern.

* * * * *